Patented Apr. 16, 1940

2,197,710

UNITED STATES PATENT OFFICE 2,197,710

ACYLATED INDENES AND POLYMERIZATION PRODUCTS THEREOF AND PROCESSES OF PREPARING THE SAME

Anderson W. Ralston, Robert J. Vander Wal, and Stewart T. Bauer, Chicago, Ill., assignors to Armour and Company, Chicago, Ill., a corporation of Illinois No Drawing. Application September 2, 1938, Serial No. 228,260

6 Claims. (Cl. 260—80)

This invention relates to acylated indenes and polymerization products thereof, and it comprises as new compositions of matter products prepared by reacting indenes with fatty acid chlorides containing at least twelve carbon atoms in the presence of metallic chlorides.

Among the resins now prepared commercially one of the most important types is that prepared from indene or indene polymers. These resins can be prepared from indene or indene fractions by the heat polymerization of indene in the presence of certain catalysts. An article by Carmody, Sheehan and Kelly, Ind. Eng. Chem. 30, 245-51 (1938), describes the preparation of resins by the heat polymerization of indene-containing materials. Resins prepared from indene possess a number of important properties and are of exceptional commercial interest because of the availability and cheapness of indene-containing materials.

We have discovered new types of synthetic resins which can be prepared by the action of fatty acid chlorides having twelve or more carbon atoms upon the indenes in the presence of metallic chlorides, such as aluminum chloride. These products have properties quite different from those prepared from indene itself. The properties are dependent upon the nature and proportions of the particular fatty acid employed and the conditions used in the preparation of the acylated indene. The products we obtain vary from highly viscous liquids having drying properties to hard solids. We have further discovered that these resins have a number of uses, such as in the insulation of wires, as dielectrics, as constituents of varnishes, as protective layers for metals, in various compositions for the ornamentation or protection of wooden surfaces, as molding resins and in the general plastic field.

As above stated, these products are made by the reaction of indenes with fatty acid chlorides containing twelve or more carbon atoms in the presence of metallic chlorides. Our final products are obtained by hydrolyzing the metallic complexes which are first obtained. All of the final products are free of the metal used in the condensation. Under the conditions of preparation of our products the indenes are simultaneously polymerized and acylated since the compounds catalyzing the acylation also catalyze the polymerization of the indenes.

The following examples can be given as descriptive of the general preparation and properties of these products:

Example 1

Twenty grams of aluminum chloride are suspended in 50 cc. of tetrachloroethane in a three-necked flask equipped with a stirrer, dropping funnel and thermometer. To this is added, rapidly, 30 grams of stearyl chloride, the temperature being held below 25° C. during the addition. 15.7 grams of a 74 percent solution of indene in tetrachloroethane are added over a period of one and one-half hours. The temperature varies between about 25° and 30° C. during the addition. The temperature is then kept at about 45° to 55° C. for about one hour. The resulting reaction product is then hydrolyzed by admixing with ice and the solvents removed by steam distillation. The product is dissolved in ether, washed well with water and the ether solution dried with sodium sulfate. The ether is then removed under a vacuum. 36 grams of a semi-solid plastic mass are obtained.

Example 2

Twenty grams of aluminum chloride, 3 grams of stearyl chloride and 15.7 grams of a 74 percent indene solution are treated as described under Example 1. After hydrolysis the product obtained is a hard resin which is, however, more flexible than that prepared by polymerization of the indene solution per se.

Example 3

Twenty grams of aluminum chloride, 10 grams of oleyl chloride dissolved in 25 cc. of tetrachloroethane and 15.7 grams of a 74 percent indene solution are reacted as described under Example 1. 50 cc. of tetrachloroethane are also used to suspend the aluminum chloride. The final product is a quick, viscous liquid which dries to a hard film when exposed to atmospheric conditions.

Example 4

Twenty grams of aluminum chloride are suspended in 50 cc. of tetrachloroethane and 10 grams of lauryl chloride added rapidly. The temperature is kept below 25° C. 15.7 grams of an indene solution containing 74 percent of indene are now added. The reaction is then conducted as described under Example 1. After hydrolysis and removal of the solvent the product is a flexible resin.

Example 5

Twenty grams of aluminum chloride suspended in 50 cc. of tetrachloroethane are placed in the reaction flask and cooled to below 20° C. 30 grams of linolenyl chloride dissolved in 25 cc. of tetrachloroethane are added over a period of one-half hour at such a rate that the temperature of the reaction mixture does not rise over 25° C. 15.7 grams of a 74 percent solution of indene are now added over a period of two hours by means of a dropping funnel. The temperature of the reaction is kept below 25° C. during this addition. The mixture is then heated for two hours at 50°-55° C. The mixture is then hydrolyzed by pouring on ice and the solvent is removed by steam distillation. The product is extracted with ether, washed with water, dried over sodium sulfate and the ether removed by distillation. The product is a viscous oil possessing drying properties. When spread out in a thin film it hardens rapidly to a glossy surface which possesses a high degree of flexibility.

*Example 6*

Twenty grams of aluminum chloride, 10 grams of linolenyl chloride and 15.7 grams of a 74 percent indene solution are reacted together as described under Example 5. The product is much more solid than that described under Example 5 and changes rapidly to a hard, flexible plastic when exposed to atmospheric conditions.

*Example 7*

Twenty grams of aluminum chloride, 30 grams of mixed palmityl and stearyl chlorides and 15.7 grams of a 74 percent indene solution are reacted as described under Example 1. A semi-solid plastic mass similar to that described under Example 1 is obtained.

All of the above described resins differ from those obtained by the heat polymerization of the indenes themselves. They are generally somewhat harder but possess decidedly more flexibility. Those prepared from unsaturated acid chlorides have drying properties and can be used in varnishes or lacquers for coating metals, etc. The hardness varies with the proportion of acid chloride to indene and generally those containing a molecular proportion of indene to acid chloride of one to eight possess the greatest hardness. These resins are formed by the simultaneous polymerization and acylation of the indenes, the hydrogen chloride liberated during the reaction serving as a polymerization catalyst.

We wish to clearly distinguish this invention from those describing the preparation of resins from indenes, which resins are plasticized by the addition of ketones or like materials. In this invention the plastic and resinous properties of the products are due to their chemical nature and not to the addition of other components.

While our description has been limited to the use of a few specific fatty acid chlorides, any fatty acid chloride containing at least twelve carbon atoms in the molecule will work. Thus fatty acid chlorides, such as lauryl, myristyl, palmityl, stearyl, oleyl, linoleyl and linolenyl chlorides, or mixtures of the same can be used. Fatty acid chlorides made from fatty acids prepared by the oxidation of paraffin wax or other hydrocarbons can also be used.

The products of our invention are, in a sense, Friedel-Crafts reaction products of an indene and a fatty acid chloride because we generally use equimolecular quantities of aluminum chloride and fatty acid chloride, and we hydrolyze the intermediate complex aluminum chloride compound.

In the appended claims when we refer to "an indene" we mean either indene or polymerization products thereof, such as the dimer, trimer or tetramer, etc., wherein indene is the essential polymerizing component.

Having thus described our invention, what we claim is:

1. The process which comprises reacting an indene with a fatty acid chloride having at least twelve carbon atoms in the presence of a Friedel-Crafts reaction catalyst, hydrolyzing the reaction product thus formed and recovering a catalyst-free final product.

2. The process as in claim 1 wherein the fatty acid chloride is stearyl chloride.

3. The process as in claim 1 wherein the fatty acid chloride is an unsaturated fatty acid chloride having at least twelve carbon atoms.

4. The resinous product obtained by reacting an indene with a fatty acid chloride having at least twelve carbon atoms in the presence of a Friedel-Crafts reaction catalyst, hydrolyzing the reaction product thus formed, and recovering a catalyst-free resinous final product.

5. The resinous product as in claim 4 wherein the fatty acid chloride used is stearyl chloride.

6. The resinous product as in claim 4 in which the fatty acid chloride used is an unsaturated fatty acid chloride having at least twelve carbon atoms.

ANDERSON W. RALSTON.
ROBERT J. VANDER WAL.
STEWART T. BAUER.